(12) United States Patent
Lu et al.

(10) Patent No.: US 11,204,693 B2
(45) Date of Patent: Dec. 21, 2021

(54) SCREENSHOT BASED TUI PROCESS FOR IN-APP PURCHASE AUTHENTICATION

(71) Applicant: Samsung Electronics Co., Ltd., Suwon-si (KR)

(72) Inventors: Yi Lu, Santa Clara, CA (US); Junyuan Zeng, Santa Clara, CA (US); Pai Peng, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 16/124,991

(22) Filed: Sep. 7, 2018

(65) Prior Publication Data

US 2020/0081615 A1 Mar. 12, 2020

(51) Int. Cl.
| | | |
|---|---|---|
| *G06F 3/0488* | (2013.01) | |
| *G06F 21/31* | (2013.01) | |
| *G06Q 20/40* | (2012.01) | |

(52) U.S. Cl.
CPC .......... *G06F 3/04883* (2013.01); *G06F 21/31* (2013.01); *G06Q 20/4014* (2013.01); *G06F 2203/04803* (2013.01)

(58) Field of Classification Search
CPC .................. G06F 3/04883; G06F 21/31; G06F 2203/04803; G06Q 20/4014
See application file for complete search history.

(56) References Cited

U.S. PATENT DOCUMENTS

| | | | | |
|---|---|---|---|---|
| 9,813,429 | B2* | 11/2017 | Kass | ........................ H04L 63/14 |
| 2011/0063687 | A1* | 3/2011 | Inui | ..................... H04N 1/00214 |
| | | | | 358/442 |
| 2011/0162078 | A1* | 6/2011 | Taveau | .................. G06F 21/445 |
| | | | | 726/26 |
| 2012/0102557 | A1* | 4/2012 | Felton | .................... G06Q 40/02 |
| | | | | 726/7 |
| 2015/0046712 | A1 | 2/2015 | Korkishko et al. | |
| 2017/0337542 | A1 | 11/2017 | Kim et al. | |
| 2018/0114223 | A1* | 4/2018 | Dellostritto | ........ G06Q 30/0633 |

(Continued)

FOREIGN PATENT DOCUMENTS

| | | |
|---|---|---|
| CN | 103824033 A | 5/2014 |
| JP | 4932998 B2 | 2/2012 |

(Continued)

*Primary Examiner* — Daniel Samwel
*Assistant Examiner* — Samuel Shen

(57) ABSTRACT

A method for generating a secure single-tap authentication user interface includes obtaining a screenshot of content from an application operating in an execution environment outside of a trusted execution environment, generating graphical elements of a single-tap authentication user interface, and generating a progress switching layer. Additionally, the method includes responsive to an authentication request, generating a composited display, the composited display comprising the screenshot of content from the application, the graphical elements of the single-tap authentication user interface, and the progress switching layer, passing the composited display from outside the trusted execution environment to the trusted execution environment and displaying, by the trusted execution environment, the composited display as part of a trusted user interface (TUI).

17 Claims, 9 Drawing Sheets

(56) References Cited

U.S. PATENT DOCUMENTS

| | | | |
|---|---|---|---|
| 2018/0121681 A1* | 5/2018 | Huang | G06F 21/83 |
| 2019/0057212 A1* | 2/2019 | Zhao | G06Q 20/4012 |
| 2019/0080189 A1* | 3/2019 | Van Os | G06F 3/016 |

FOREIGN PATENT DOCUMENTS

| | | |
|---|---|---|
| KR | 20120081961 A | 7/2012 |
| KR | 20160099464 A | 8/2016 |
| KR | 101656383 B1 | 9/2016 |
| KR | 20170023672 A | 3/2017 |
| KR | 20170025976 A | 3/2017 |
| KR | 20180001224 A | 1/2018 |
| WO | 2011149170 A1 | 12/2011 |

* cited by examiner

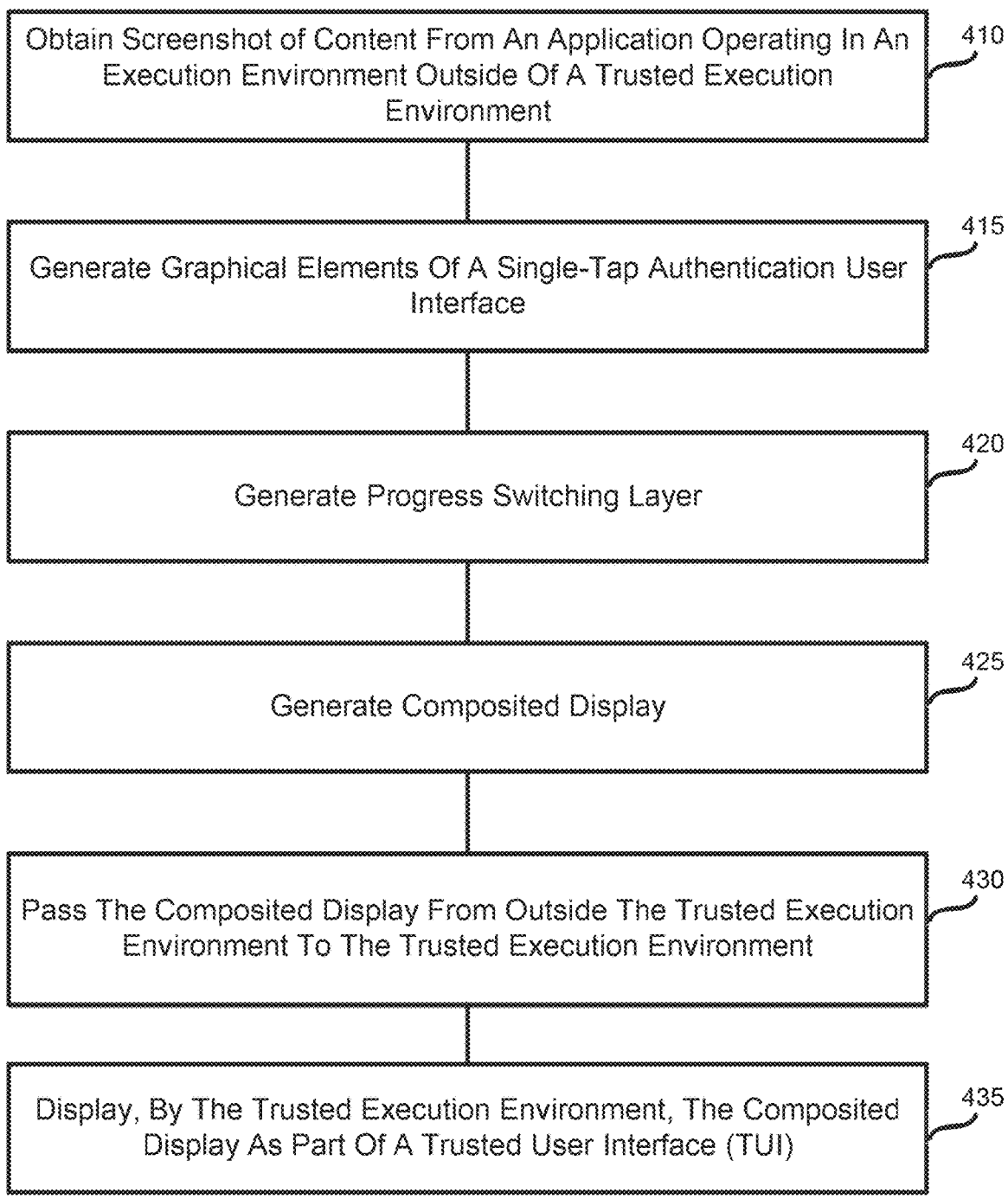

FIG. 5
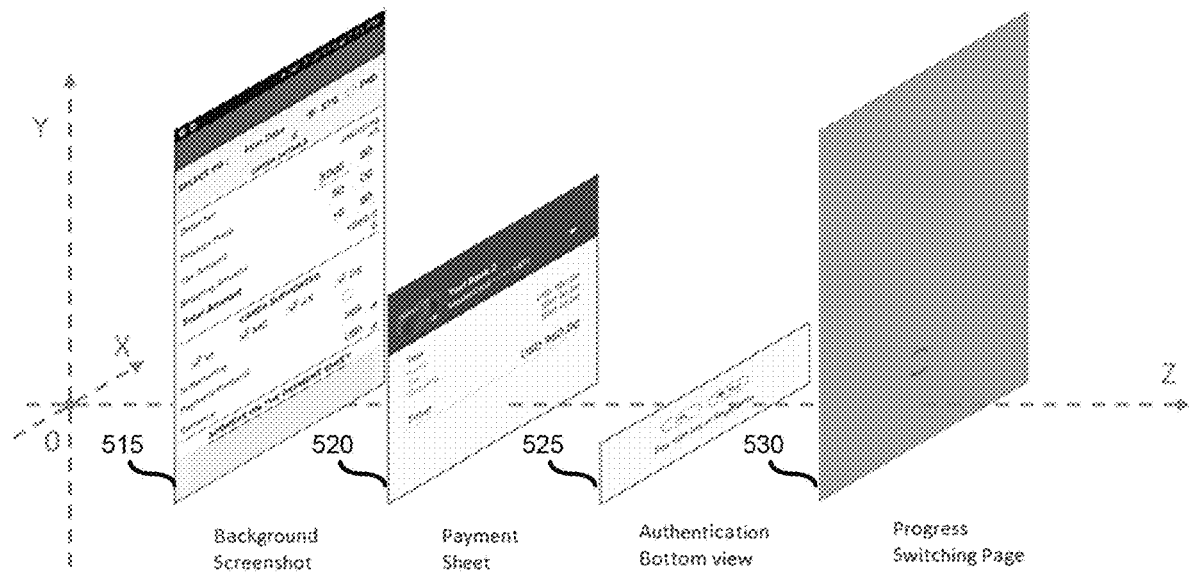
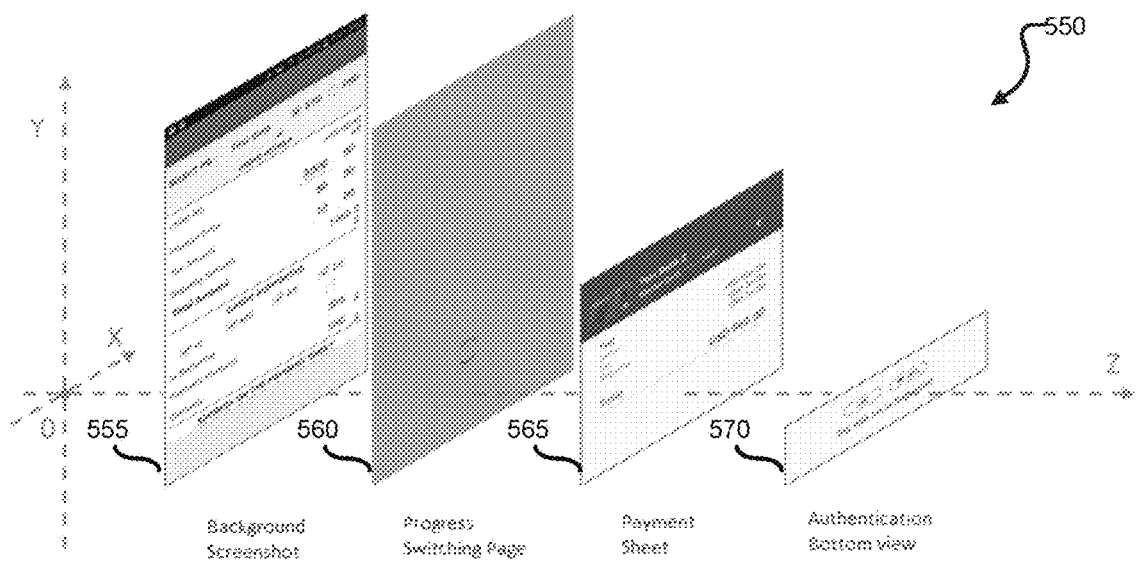

SCREENSHOT BASED TUI PROCESS FOR IN-APP PURCHASE AUTHENTICATION

TECHNICAL FIELD

This disclosure relates generally to computing and provide a secure user interface in computing platforms which include a trusted execution environment. More specifically, this disclosure relates to a trusted user interface process for in-application purchase authentication.

BACKGROUND

Computing platforms, including, without limitation, some smartphones, tablets and other portable computing devices provide a trusted execution environment (TEE), typically within a processor of the computing platform. The TEE can provide a secure area for storing and processing data and trusted applications (digital wallets and other applications separate from applications and the normal operating system (OS) running outside of the TEE. In some cases, the security of the TEE is enforced at both the physical level (for example, through hardware isolation), and at a logical level (for example, through cryptography and software implemented isolation, such as a separate TEE operating system). To ensure the security and integrity of the trusted execution zone, applications executing within the TEE may be developed using TEE-specific application programming interfaces (APIs) may not permit the full range of program functionalities supported by applications executing outside of the TEE.

The differences in functionality between applications executing in a TEE versus outside of a TEE manifest themselves in multiple contexts, including without limitation, the appearance and functionality of user interfaces (referred to herein as "trusted user interfaces" or TUIs) presented by the TEE. For example, TUIs may not support detection of complicated user gestures, such as swiping or scrolling. The differences in supported functionalities between normal world execution environments and TEEs provide both a source of technical challenges and opportunities for improvement of the appearance and functionality provided by TUIs.

SUMMARY

This disclosure provides a screenshot based trusted user interface (TUI) process for in-application purchase authentication.

In a first embodiment, a method for generating a secure single-tap authentication user interface includes obtaining a screenshot of content from an application operating in an execution environment outside of a trusted execution environment, generating graphical elements of a single-tap authentication user interface, and generating a progress switching layer. Additionally, the method includes responsive to an authentication request, generating a composited display, the composited display comprising the screenshot of content from the application, the graphical elements of the single-tap authentication user interface, and the progress switching layer, passing the composited display from outside the trusted execution environment to the trusted execution environment and displaying, by the trusted execution environment, the composited display as part of a trusted user interface (TUI).

In a second embodiment, an apparatus includes a screen, a processor comprising a trusted execution environment, and a memory. The memory contains instructions, which, when executed by the processor, cause the apparatus to obtain a screenshot of content from an application operating in an execution environment outside of the trusted execution environment, generate graphical elements of a single-tap authentication user interface, and generate a progress switching layer. Further, the memory includes instructions, which, when executed by the processor cause the apparatus to responsive to an authentication request, generate a composited display, the composited display comprising the screenshot of content from the application, the graphical elements of the single-tap authentication user interface, and the progress switching layer, pass the composited display from outside the trusted execution environment to the trusted execution environment, and display, by the trusted execution environment, the composited display as part of a trusted user interface (TUI) on the screen.

In a third embodiment, a non-transitory medium includes program code, which when executed by a processor, causes an apparatus to obtain a screenshot of content from an application operating in an execution environment outside of a trusted execution environment, generate graphical elements of a single-tap authentication user interface, and generate a progress switching layer. Additionally, the non-transitory computer-readable medium includes program code, which, when executed by the processor, causes the apparatus to, responsive to an authentication request, generate a composited display, the composited display comprising the screenshot of content from the application, the graphical elements of the single-tap authentication user interface, and the progress switching layer, pass the composited display from outside the trusted execution environment to the trusted execution environment and display, by the trusted execution environment, the composited display as part of a trusted user interface (TUI) on a screen.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 4A and 4B illustrate operations of a method for providing a screenshot-based TUI process for in-application purchase authentication according to certain embodiments of this disclosure;

FIG. 5 illustrate examples of generating composited displays according to certain embodiments of this disclosure;

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
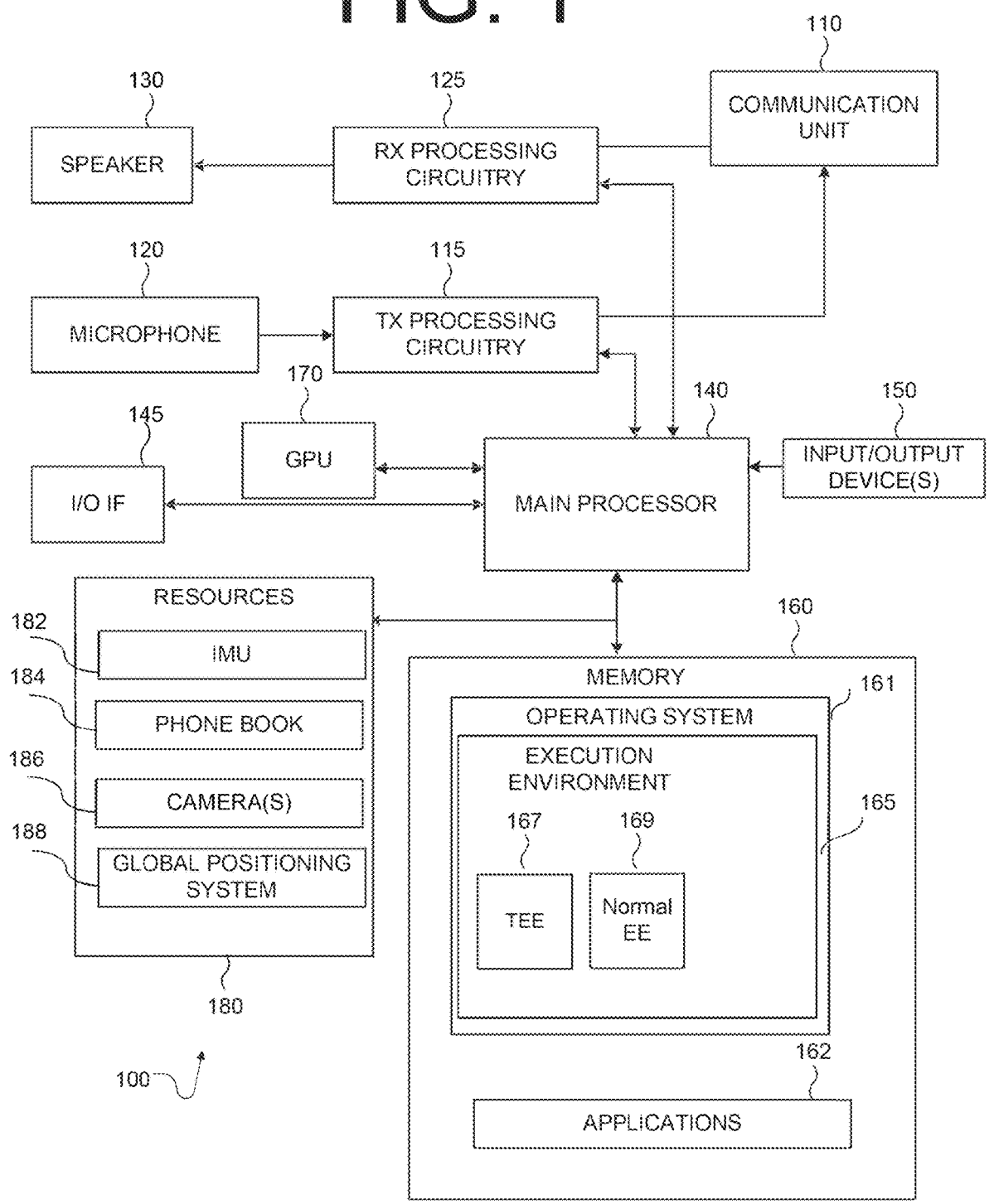
FIG. 1 illustrates an example of an electronic device for implementing a screenshot based TUI process for in-application purchase authentication, according to certain embodiments of this disclosure.

FIG. 1 illustrates an example of an electronic device for implementing a screenshot-based TUI process for in-application purchase authentication, according to certain embodiments of this disclosure. The embodiment of the electronic device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a BLUETOOTH transceiver, or a Wi-Fi transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games (including games which permit in-application purchases, such as purchases of game characters or in-game materiel), shopping applications, social media applications (including, without limitation, games that allow in-application purchases, such as purchases of "skins" or other graphic content to be displayed within the application), applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to certain embodiments, applications 162 may include an application associated with a counterparty to a digital transaction (for example, a merchant's shopping application. According to some embodiments, applications 162 comprise a mobile wallet application (for example, SAMSUNG PAY, APPLE PAY, GOOGLE PAY, PAYPAL, etc.) providing a secure, or easy payment service from a user's mobile device. Further, applications 162 may include applications containing program code that when executed by a processor, such as main processor 140, cause the processor to perform steps of methods for monitoring suspicious application access according to certain embodiments of the present disclosure.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

Additionally, operating system 161 is capable of providing an execution environment 165 for applications. According to some embodiments, execution environment 165 includes a trusted execution environment ("TEE") 167 (for example TRUSTZONE by ARM) and a normal execution environment 169. According to certain embodiments, certain memory and processor resources accessible in TEE 167 are not accessible to applications running in "normal world" 169. In some embodiments, TEE 167 provides a trusted user interface through which content associated with sensitive device functionalities (for example, payments to be made using a mobile wallet application) can be rendered and displayed for a user.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, resources 180 include an accelerometer or inertial motion unit 182, which can detect movements of the electronic device along one or more degrees of freedom. Additional resources 180 include, in some embodiments, a user's phone book 184, one or more cameras 186 of electronic device 100, and a global positioning system 188.

Although FIG. 1 illustrates one example of a device 100 for implementing a screenshot-based TUI process for in-application purchase authentication, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
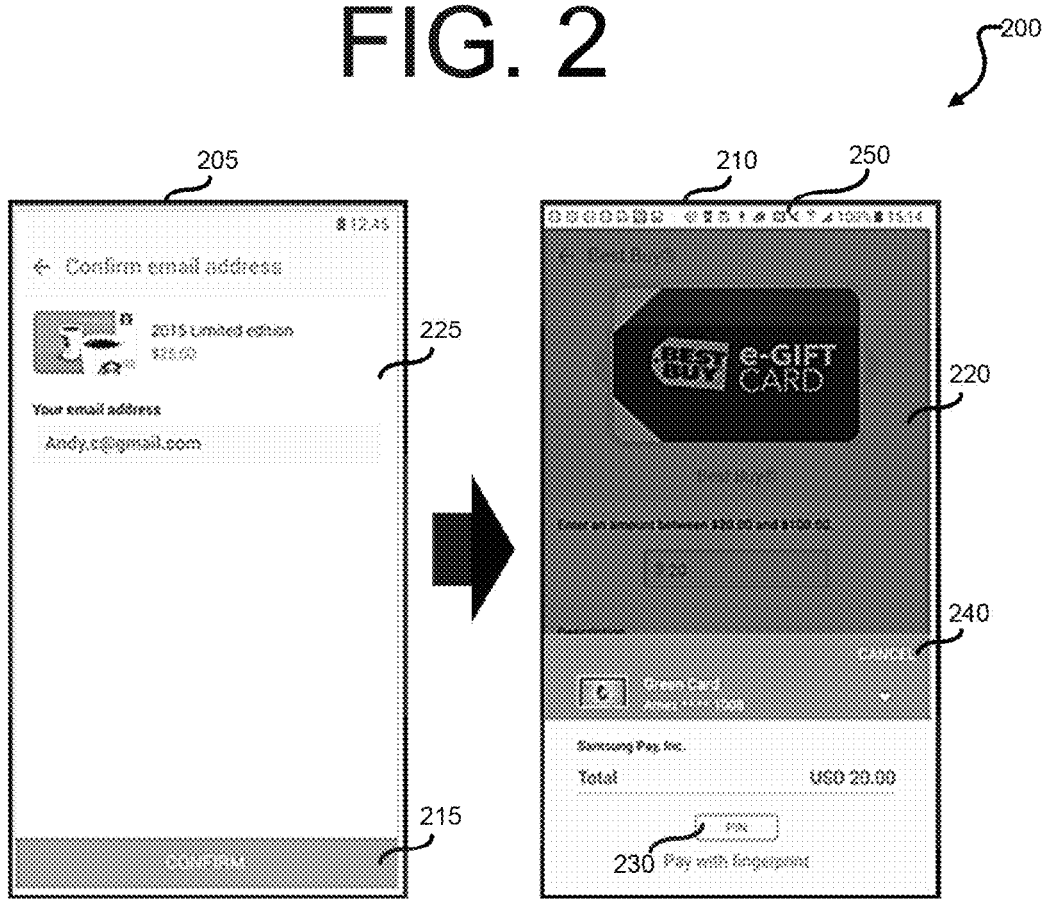
FIG. 2 illustrates an example of a screen flow 200 and user interfaces presented in a two-tap authentication procedure.

FIG. 2 illustrates an example of a screen flow 200 and user interfaces presented in a two-tap authentication procedure. The embodiment of the screen flow 200 shown in FIG. 2 is for illustration only and other examples could be used without departing from the scope of the present disclosure.

Referring to the non-limiting example of FIG. 2, a first user interface 205 and a second user interface 210 for authenticating an in-application purchase on a device (for example, device 100 in FIG. 1), are shown. In this particular example, the user performs two separate authentication operations (hence the term "two-tap authentication procedure") by first authorizing the release of credentials maintained in a TEE of the device, as well as by providing a datum (for example, a PIN code or a fingerprint scan) to a UI generated outside of the TEE.

As shown in FIG. 2, a first user interface 205 is shown. First user interface 2015 is presented in response to a purchase (or other action requiring authentication using information or processes maintained in the TEE of a device) initiated by a user's interaction with an application operating outside of the TEE.

In this illustrative example, first user interface 205 is a TUI presented by a TEE on the device, and comprises a screen area 215 with the legend "confirm," which the user can tap to trigger part of a purchase authorization. The portion of the purchase authorization action triggered by the user tapping screen area 215, may comprise, for example, triggering an application running in the TEE (for example, a mobile wallet application) or a TEE process (for example, the generation of a token containing a trusted and guarded identifier, such as a cryptographic key) associated with providing a trusted authentication of the user. As shown in FIG. 2, the TEE on the device does not support as rich a range of UI functionality as the normal world processing environment, and the content 225 displayed as part of first UI 215 comprises text and a graphic on a white background which completely obscures the application from which the user initiated the purchase process.

Subsequent to performing a first portion of the purchase authentication process (or "first tap") through first UI 205, screen flow 200 proceeds to second UI 210. In the example of FIG. 2, second UI 210 is generated outside of the TEE, by the application from which the purchase process was launched. Second UI 210 includes a prompt 230 for a fingerprint or PIN code as a second authenticating input from the user (also referred to as the "second tap" of a "two-tap authentication process"). As shown in FIG. 2, second UI 210 is generated outside of the trusted execution environment and supports a richer range of functionality than first UI 205. For example, second UI 210 includes a context region 220 from the application from which the purchase process was launches, the context region 220 showing the purchase of a $20.00 gift card. Second UI also includes navigation buttons, such as "cancel" button 240. Additionally, content generated by a normal world OS and other applications is provided on the screen, such as in status bar 250.

The two-tap authentication process shown with reference to screen flow 200 presents several opportunities for improvement in the functionality of the TUI provided by the TEE. First, requiring the user to interact with two separate UIs to provide the same underlying input (e.g., providing a trusted authorization of an in-application purchase) is inefficient and unwieldy. Second, first UI 205 supports a limited set of functionalities, and covers up the context provided by the normal world application through which the user initiated the purchase. This means that, while performing the first part of a two-tap authentication process, the user cannot see the application information (for example, the price shown by the application and the good being ordered) reminding the user as to what, specifically, she is authorizing the purchase of. Third, part of the two-tap authentication process is conducted through an application operating outside of the TEE, meaning that part of the authentication process does not enjoy the additional security protections provided by the TUI and TEE. To illustrate the possibility of malicious attack and the injection of specious or spoofing content into second UI 210, in FIG. 2, first UI 205 shows a different dollar amount and text for the transaction than second UI 210.

Figure 3:
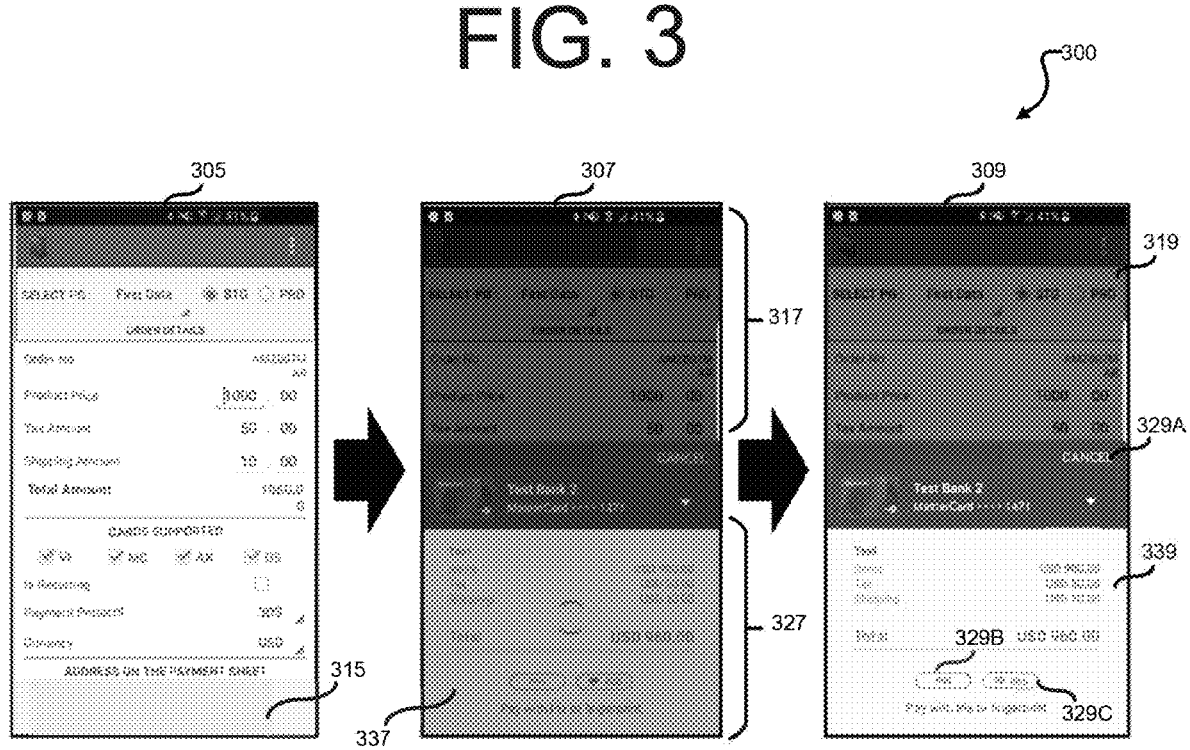
FIG. 3 illustrates an example of a screen flow and user interfaces presented in a one-tap authentication procedure according to certain embodiments of this disclosure.

FIG. 3 illustrates an example of a screen flow 300 and user interfaces presented in a one-tap authentication procedure according to certain embodiments of this disclosure. The embodiment of the screen flow 300 shown in FIG. 3 is for illustration only and other examples could be used without departing from the scope of the present disclosure.

Referring to the non-limiting example of FIG. 3, screen flow 300 illustrates a progression from a first screen 305 to an intermediate screen 307, to a third screen 309, which provides a screenshot-based single-tap TUI for authorizing in-application purchases.

In some embodiments, first screen 305 comprises a display associated with an application executing outside of the TEE. In this example, first screen 305 is a screen presented by a merchant application for configuring an in-application purchase. First screen 305 provides a user interface by which the user can see, and as appropriate, adjust the parameters of an in-application purchase (for example, by selecting a different payment protocol, or changing the payment currency). As shown in the non-limiting example of FIG. 3, first screen 305 includes payment button region 315 for launching an authentication procedure to confirm and complete the in-application purchase.

According to various embodiments, responsive to tapping payment button region 315, an application outside of the TEE generates and displays intermediate screen 307. In the non-limiting example of FIG. 3, intermediate screen 307 is a composited display generated from a screenshot 317 of first screen 305, graphical elements of a single tap authentication user interface 327 and a progress switching layer 337. To indicate to the user that the TUI is not yet available for the user to provide a single-tap authentication, intermediate screen 307 is composited such that progress switching layer 337, which can be a semi-opaque grey filter or other graphic indicator, appears to be the topmost layer of the on-screen image.

Referring to the non-limiting example shown in FIG. 3 of this disclosure, in transition screen 307, a composited image which includes a screenshot of content from an application, graphical elements of a single-tap authentication user interface, and a progress switching layer is shown as being displayed on a screen. In the example of FIG. 3, the displayed image is composited such that the progress layer appears as a top layer of the composited image. A greyed-out overall appearance of intermediate screen 307 or other graphic indicator provides a visual cue to the user that the device is not yet ready to proceed with a single-tap authentication.

As shown in the non-limiting example of FIG. 3, third screen 309 is part of a trusted user interface provided by the TEE for purchase authentication. In contrast to first UI 205 shown in FIG. 2, third screen includes, transaction context information 319 from the application in which the purchase was initiated. Additionally, in contrast to first UI 205 in FIG. 2, the example shown in third screen 309 includes multiple buttons, or actionable areas 329A-C through which a user can select a mode of authentication, or, if desired, cancel the authentication procedure. Further, third screen 309 includes a display 339 of transaction context information from the TEE, which allows the user to compare the transaction parameters provided to the TEE with those displayed by the application, in order to identify discrepancies and potential fraud. In this particular example, the dollar amounts shown through TEE transaction parameters do not match those shown by the transaction context information 319 displayed by the application in which the purchase was initiated. Further, in this particular example, the user input for authentication (also referred to herein as a "tap") is only provided through the TUI, rather than through a combination of the TUI and a UI presented from a normal execution environment. Accordingly, by simplifying the authentication process to a single tap provided to a TUI, a user's fingerprint or PIN data is less susceptible to attack or theft.

FIG. 4A illustrates operations of a method 400 for providing a screenshot-based TUI process for in-application purchase authentication according to some embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. According to certain embodiments, method 400 is practiced on a computing platform with a trusted execution environment (TEE), and an execution environment (for example, a "normal world" execution environment) outside of the TEE.

Referring to the non-limiting example of FIG. 4A, at operation 410, an electronic device (for example, device 100 in FIG. 1) obtains a screenshot of content from an application operating in an execution environment outside of a trusted execution environment of the device. By way of illustrative example, suppose a user has, through a shopping application running in a normal world execution environment (for example, AMAZON.COM) of a mobile phone, selected an item for purchase, and navigated to a checkout page summarizing the parameters of the transaction (for example, an identification of the item, as well as price and shipping information. In this example, the checkout page may include a button or other interface by which the user can authorize a payment to complete the transaction. In this example, at operation 410, a screenshot of the content displayed in the checkout page is captured and stored outside of the TEE.

As shown in the non-limiting example of FIG. 4A, in operation 415, the electronic device generates the graphical elements of a single tap authentication user interface. According to certain embodiments, the graphical elements of the single tap user interface include a ribbon, or bottom view bar including defined actionable regions which a user can tap to trigger actions in the TEE (for example, providing a trusted identifier of the user, or cancelling a TUI and returning to a normal world application). In some embodiments, the graphical elements of a single tap authentication user interface also include a payment sheet displaying parameters of the transaction to be authorized, as generated by the electronic device.

In some embodiments according to this disclosure, at operation 420, the electronic device generates a progress switching layer. In certain embodiments, a progress switching layer comprises a visual indicator that can be included as part of a composited display to provide an indication of the progress of a single-tap authentication process. Examples of progress switching layers according to this disclosure include semi-opaque layers of one or more colors to which impart a dimmed, or filtered appearance to some or all of the displayed content, as well as layers superimposing displaying a visible, but nonobtrusive pattern.

Referring to the non-limiting example of method 400, at operation 425, the electronic device generates a composited display to be passed to the TEE. According to certain embodiments, generating the composited display consists of selecting and assembling graphical content to be displayed as part of a trusted user interface for authentication, and rasterizing the graphical content. For example, at operation 425, the electronic device may select the screenshot generated in operation 410, the graphical elements generated in operation 415 and the progress switching layer generated at operation 420 as image layers to be assembled and composited. According to certain embodiments, at operation 425, the electronic device (or a graphics pipeline executing on the electronic device) may generate a composited display which has the appearance of being a multi-layered image, in which the progress switching layer appears as an intermediate layer below a layer comprising the graphical elements of the single-tap authentication user interface, and in which the progress switching layer appears as the top layer.

In various embodiments, at operation 430, the composited display is passed from the normal world processing environment to the TEE.

In certain embodiments, at operation 435, the trusted execution environment displays the composited display as part of a trusted user interface (TUI). According to certain embodiments, the TUI comprises the composited display (as shown, for example, by third screen 309 in FIG. 3), and includes actionable regions, such as 329A-C, which the user can tap to, inter alia, cancel the TUI, or alternatively, perform a one-tap authentication process within the TUI. In this way, the TUI displayed at operation 435 has the look and feel of a UI generated in a normal world execution environment. For example, the TUI presented at operation 435 has regions which can be tapped like buttons, and the content from the application in which the purchase was initiated. At the same time, the TUI displayed at operation 435 has the improved security provided by a TUI, meaning that the user's fingerprint information or PIN do not have to pass through the normal world processing environment to complete the authentication procedure.

Figure 4B:
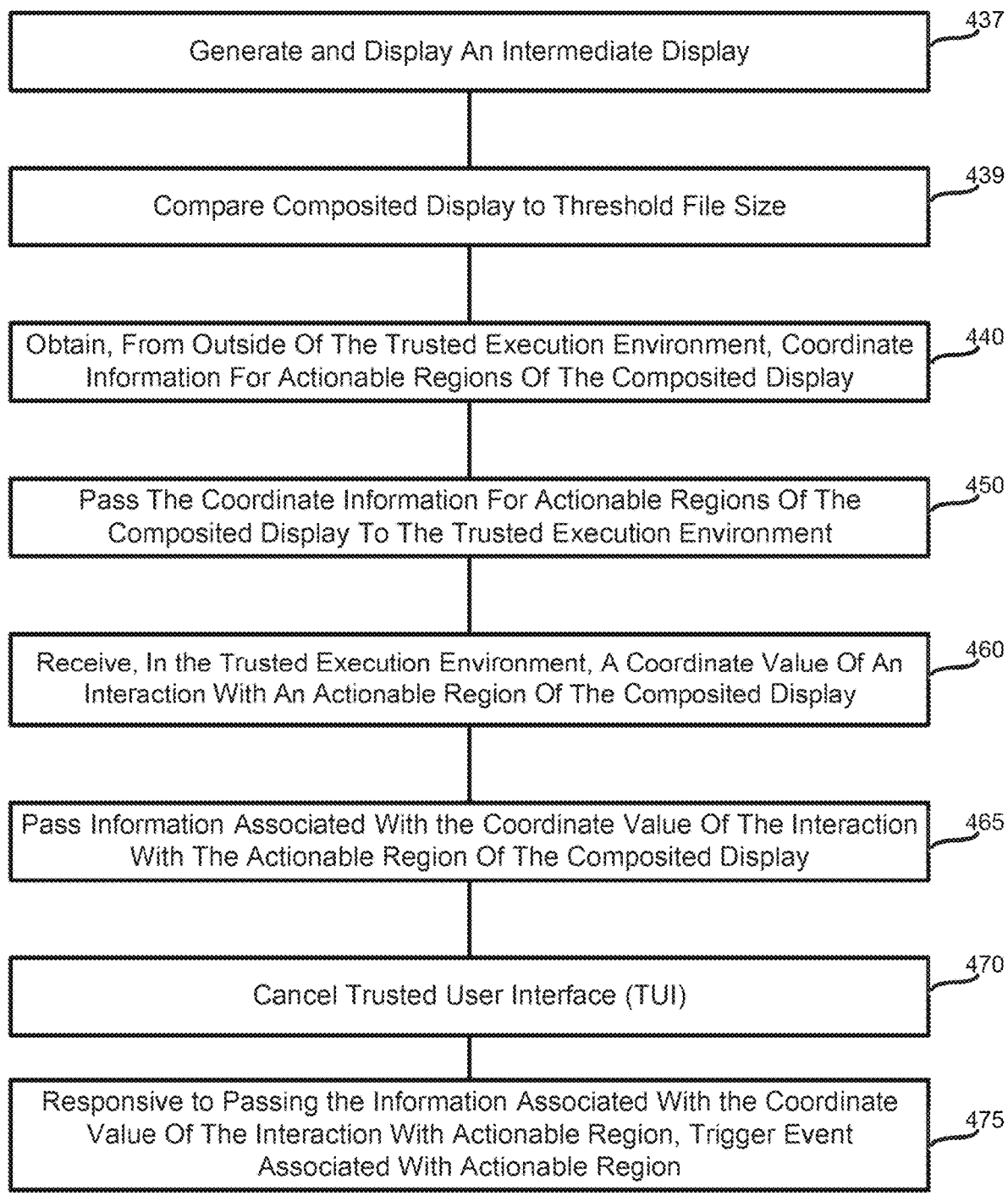

FIG. 4B illustrates operations, which, in certain embodiments according to this disclosure, may also be performed as part of a method for providing a screenshot-based TUI process for in-application purchase authentication according to various embodiments of this disclosure.

According to certain embodiments, at operation 437, the electronic device may generate and display an intermediate display (for example, second display 307 in FIG. 3). In some embodiments, the intermediate display is a composited display which is generated according to the same graphics process as the composited display generated in operation 425, but which differs in that the elements of the display are assembled in a different sequence, thereby providing a visual cue that the electronic device is "thinking" or preparing to open up a TUI for a single tap authentication procedure. As shown in the non-limiting example in FIG. 3, second, or intermediate, display 307 contains the same visual elements as third screen 309, differing only in that the display is composited such that the progress switching layer appears as the top-most layer of the image.

As discussed elsewhere in this disclosure, the security of the TEE may be enforced at both the hardware and software levels. In certain embodiments, the software-level security features of the TEE may impose limits on the size of files passed from outside the TEE to inside the TEE. Accordingly, in some embodiments according to this disclosure, at operation 439, the electronic device compares the composited display generated at operation 425 to a threshold file size to determine if further processing (for example, splitting the composited display into smaller files to be reassembled in the TEE) to manage an excessive file size is required. In certain embodiments, the threshold file size corresponds to the size of a temporary buffer within the TEE for transferring image data. The size of the temporary buffer within the TEE may vary across devices, and by implication, the threshold file size to which a comparison is performed at operation 439.

As shown in the non-limiting example of FIG. 4B, at operation 440, the electronic device obtains, from outside of the trusted execution environment coordinate information for actionable regions of the composited display (for example, the composited display generated at operation 425). In certain embodiments, the TEE does not support certain UI objects and functionalities, such as buttons for triggering actions by an underlying application (for example, canceling a payment screen). Instead, in some cases, the TEE may only support receiving touch inputs at the screen and determining a coordinate value for the touch input. As used in this disclosure, the term "actionable region" encompasses portions of a touch screen display which, when touched by a user, trigger action by an application in either the TEE or normal world processing environment.

In certain embodiments which include operation 439 and where the electronic device determines that the composited display exceeds a threshold file size, the composited display is split into two or more parts, which are separately passed to the TEE and reassembled as a single image within the TEE.

According to some embodiments, at operation 450, the coordinate information associated with actionable regions of the composited display are passed to the trusted execution environment. In some embodiments, by passing the coordinate information of the actionable regions of the composited display, the TUI for user authentication (for example third screen 309 in FIG. 3) can have a button-like UI functionality which, from a user experience perspective, is equivalent to the button functionality provided by UIs generated in a normal world processing environment.

As shown by the non-limiting example of FIG. 4B, at operation 460, the electronic device receives, in the trusted execution environment, a coordinate value of an interaction with an actionable region of the composite display. In some embodiments, at operation 460, a user touches a region of the TUI which, to the user, appears to be a normal UI button, and the TEE determines a coordinate value associated with the interaction.

In certain embodiments, at operation 465, the TEE passes information associated with the coordinate value of the interaction with an actionable region received at operation 460 out of the TEE. In some embodiments, the information associated with the coordinate value of the interaction comprises the coordinate value itself, and the association between the coordinate value and the triggered action is performed outside of the TEE. In certain embodiments, some translation of the coordinate value into a different form of information (for example, an index code associated with a triggered action) is performed within the TEE, and the translation of the coordinate value in to the different form of information is passed out of the TEE.

As shown in the non-limiting example of FIG. 4B, at operation 470, the TUI is canceled in response to passing information associated with the coordinate value of an interaction with an interaction with an actionable region at operation 460. In certain embodiments, the TUI is cancelled because, in contrast to a UI generated and presented from the normal world processing environment, the TEE does not support updating or changing the TUI. Thus, to retain the look and feel of a UI generated in the normal world processing environment, the TUI is cancelled in anticipation of one or more actions associated with a change in the content displayed on the screen of the electronic device.

At operation 475, responsive to passing the information associated with the coordinate value of the interaction with the actionable region of the TUI from the TEE, the electronic device triggers an event associated with the actionable event. As a non-limiting example of an event triggered by passing the information tapping an actionable region of the TUI from the TEE, a user taps an actionable region of a TUI which appears as a button for initiating an authenticating iris scan, the information of the user's tap is passed from the TEE, triggering the cancellation of TUI and a camera of the electronic device to perform an iris scan.

Although FIG. 4B illustrates one example of a method 40 for implementing a screenshot-based TUI process for in-application purchase authentication, various changes may be made to FIG. 4B. According to certain embodiments, operations described in FIG. 4B may be omitted. For example, the intermediate display generated at operation 437 may be omitted without compromising the security of the authentication process performed by the TUI. Similarly, depending on, inter alia, how a screenshot is obtained at operation 410, operation 439 may be omitted, and, by the same token, passing the composited display to the TEE in parts may be avoided.

FIG. 5 illustrates examples of generating composited displays according to embodiments of this disclosure. The embodiments of the composited displays shown in FIG. 5 are for illustration only and other configurations could be used without departing from the scope of the present disclosure.

As discussed elsewhere herein, certain embodiments according to this disclosure provide improvements to the functionality of user interfaces presented by a trusted execution environment by providing mechanisms for presenting normal world application content in the context of a TUI. According to certain embodiments, to provide this improved UI functionality, a screenshot of content from the normal world application, as well as other items of visual content are composited into a display which is passed to the TEE. Similarly, according to some embodiments, an image file comprising intermediate display is presented prior to displaying the TUI. In some embodiments, the composited display passed to the TEE and the intermediate display have the appearance of having multiple graphic layers.

Graphic 510 illustrates aspects of generating an intermediate display (for example, second screen 307 in FIG. 3) based on a composited display according to certain embodiments of this disclosure. In the non-limiting examples of FIGS. 3 and 5, an intermediate display is a composited display having the appearance of being a multi-layer image. In some embodiments, the intermediate image is generated by a graphics, or rendering pipeline of the electronic device arranging, as stacked layers, a screenshot 515 of a UI from an application in which a purchase was launched, one or more graphical elements (for example, payment sheet 520 and authentication bottom view 525) of a single tap authentication user interface, and a progress switching page 530. Once arranged, the graphical elements are rasterized, or otherwise composited into a single image for display on the electronic device.

Graphic 550 illustrates aspects of generating a composited display to be passed to the TEE to be incorporated in a TUI for a single tap authentication user interface (e.g., third screen 309 in FIG. 3). According to the non-limiting examples presented by FIGS. 3 and 5, the composited display has the appearance of being a multi-layer image. According to certain embodiments, the composited image is generated by a graphics pipeline of the electronic device by arranging, as stacked layers, a screenshot 515 of a UI from an application in which a purchase was launched, one or more graphical elements (for example, payment sheet 520 and authentication bottom view 525) of a single tap authentication user interface, progress switching page 530 and one or more graphical elements (for example, payment sheet 520 and authentication bottom view 525) of a single tap authentication user interface. Once arranged, the graphical elements are rasterized, or otherwise composited into a single image for display on the electronic device.

In certain embodiments, the composited displays shown in the examples of graphics 510 and 550 may be generated in pieces, to conserve system resources and improve performance. For example, in certain embodiments, a screenshot of the layers presented on the screen which do not change during the authentication process may be generated. For example, in the non-limiting example of FIG. 5, the visible content of background screenshot 515 and payment sheet 520 may not change during the authentication process. Accordingly, a screenshot of background screenshot 515 and payment sheet 520 is obtained (for example, when a payment application is launched) and cached, so that further elements to be included in the composited display to be passed to the trusted execution environment can be "drawn" on top of the cached screenshot. In this way, the computational load associated with generating four separate layers and obtaining a composited display can be reduced.

Figure 6:
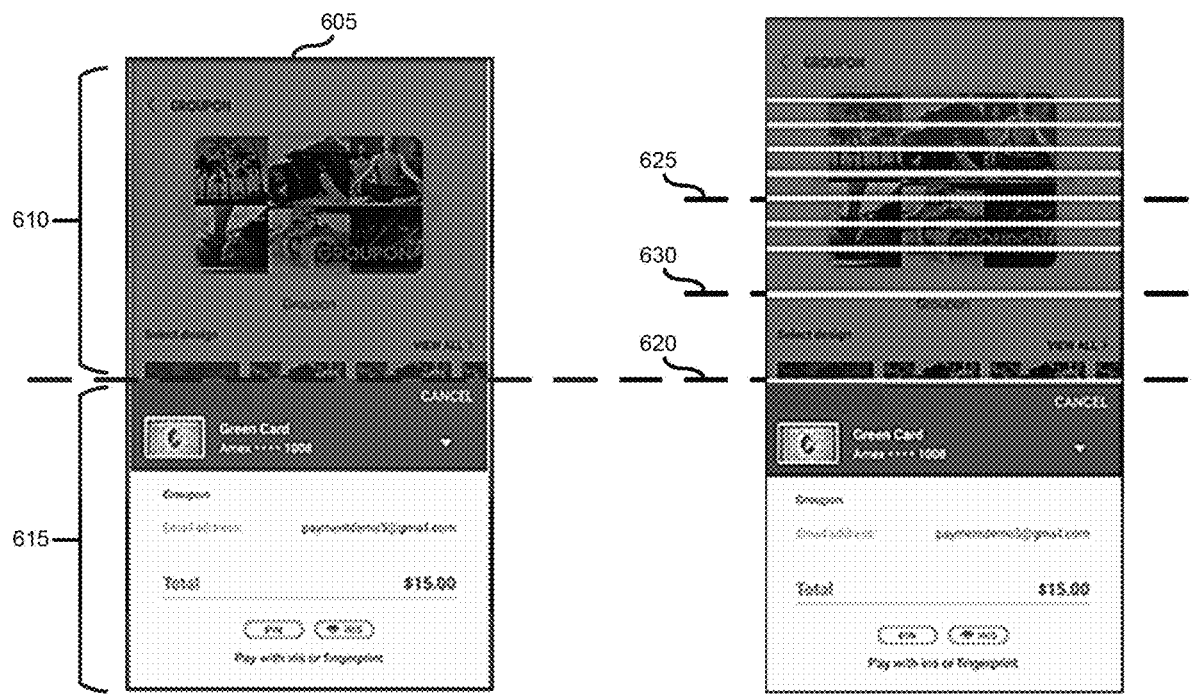
FIG. 6 illustrates aspects of splitting a composited display to be passed to a trusted execution environment according certain embodiments of this disclosure.

FIG. 6 illustrates aspects of splitting a composited display for passage to a trusted execution environment according to some embodiments of this disclosure. In certain embodiments, the isolation and security of the TEE is enforced at both the hardware level (for example, by having separate memory spaces for the TEE) and at the software level. Methods of enforcing the isolation and security of the TEE at the software level include, without limitation, specifying limits on the types and size of image files which can be passed to the TEE. For example, in certain devices, the TEE may only accept .PNG files of less than 500K in size.

According to certain embodiments, UIs presented by normal world applications from which users initiate purchases may include visual features (for example, complicated color gradients), which can significantly increase the file size of composited displays which include snapshots of the UI. In some cases, such visual features can increase the file size of a composited display which includes a snapshot of the UI beyond the specified limits for passage into a TEE. In certain embodiments according to this disclosure, composited displays which exceed the file size limits for passage into the TEE are programmatically split into smaller pieces for passage to the TEE.

Referring to the non-limiting example of FIG. 6, a composited image 605 to be passed to a TEE is shown on the left side of the FIGURE. Composited image 605 includes part of a screenshot 615 of a normal world UI, and graphical elements of an authentication user interface 615. According to certain embodiments, the contribution of the graphical elements of the authentication user interface 615 to the overall file size of the composited display are known and understood to be less than the threshold for passage into the TEE. In some embodiments, the electronic device performs a first split" of the composited image along a predetermined demarcation line 620 (for example the lower border of the part of the screenshot 615 of the normal world UI. Subsequently, the upper portion 610 of the composited display is compared against the threshold file size. If the file size is still too large, the upper portion 610 of the composited image is split along a second demarcation line 625, and a comparison of the resultant pieces are compared against the threshold file size. If necessary, the upper portion 610 is split along a third demarcation line and the resultant pieces are compared against the threshold file size. For the pieces which still exceed the threshold file size, the cycle of splitting and comparing is repeated until a set of images, each of which satisfy the threshold file size for passage into the TEE is obtained. The component pieces of composited image 605 are then passed to the TEE.

According to certain embodiments, the component pieces of composited image 605 are then reassembled in the TEE and displayed as part of a TUI.

Figure 7:
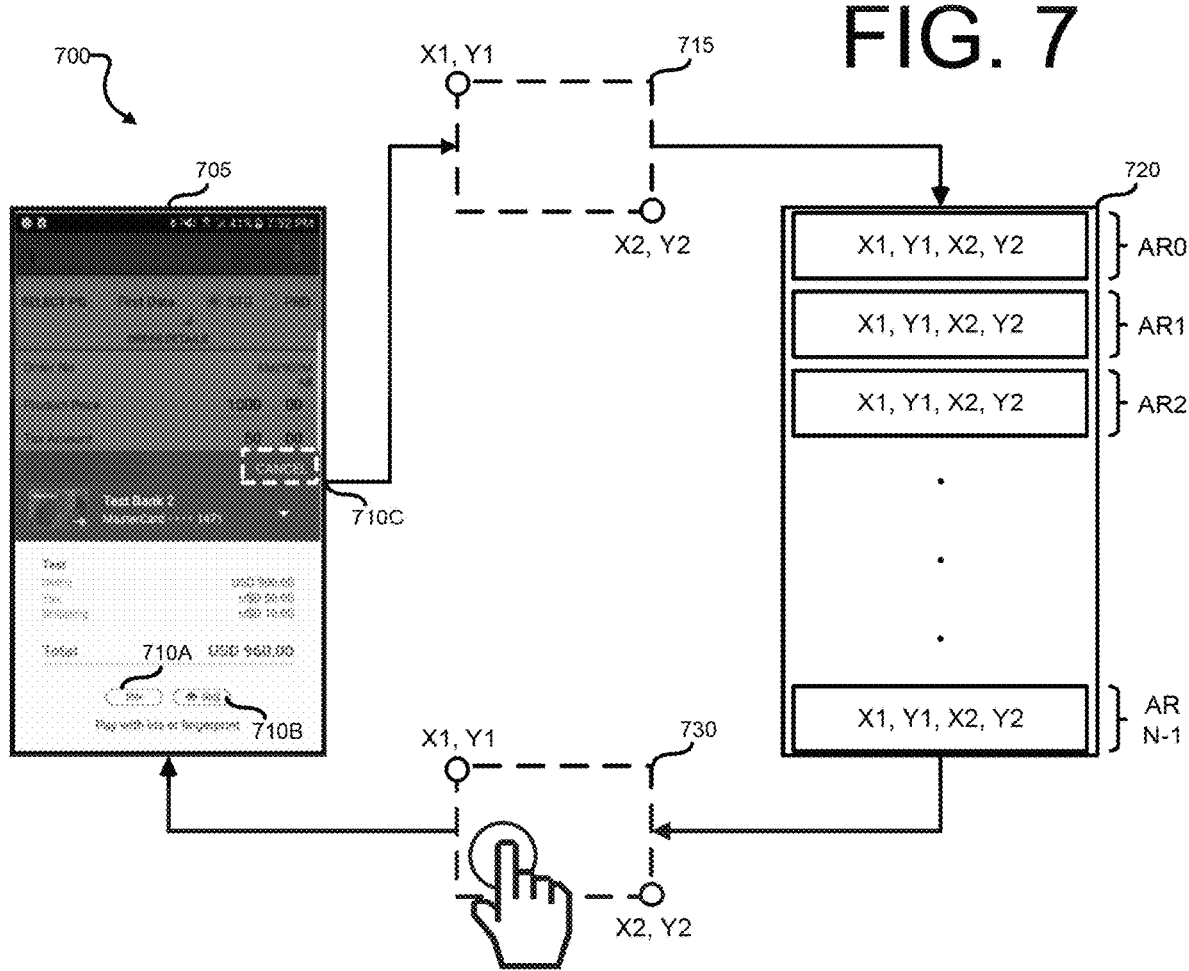
FIG. 7 illustrates aspects of a method for implementing button functionality within a screenshot based TUI according to certain embodiments of this disclosure.

FIG. 7 illustrates aspects of a method 700 for implementing button functionality within a screenshot based TUI according to various embodiments of this disclosure.

In the non-limiting example of FIG. 7, a composited display 705 to be used as part of a TUI includes regions 710A-C (hereinafter "actionable regions"), which, if tapped by a user, are to trigger actions to be taken by processes or applications on an electronic device (for example, device 100 in FIG. 1). For UIs generated in, and presented from, a normal world execution environment, such regions of the display can, in XML or another language for defining elements of a UI, be assigned buttons, widgets or other high-level display objects associating a tap by a user with a triggered action.

As noted elsewhere in this disclosure, to enforce the security provided by the TEE, certain TEEs may not support widgets or high-display objects for capturing user interactions. Instead, some TEEs may only support identifying coordinate values associated with user interactions with a touch screen display.

According to certain embodiments, the electronic device may calculate the coordinate values of the actionable regions of the composited display. In some embodiments, the calculated coordinate values for the actionable region are expressed as initial and terminal values along coordinate axes of the display. In the non-limiting example of FIG. 7, the coordinate axes of the display are X and Y, and the calculated initial and terminal ranges define a rectangular actionable region 715. For a TUI comprising multiple actionable regions, a set 720 of coordinate values for each of the coordinate regions (numbered 0 through n-1) is calculated and passed to the TEE, along with composited display 705.

At some later point, a user interacts with the TUI with a tap 730 on an actionable region of the TUI. In response to tap 730, the TEE determines the coordinate value of the tap and passes information associated with the coordinate value of the interaction to outside of the TEE. In some embodiments, the information passed outside of the TEE comprises an index code associated with the coordinate value. In certain embodiments, the information passed outside of the TEE comprises the coordinate value of the tap. Responsive to the tap, the TUI cancels itself, returning the user to the UI of the normal world application, and also triggers the action associated with the actionable region. In this case, the action associated with actionable region 715 is a cancellation of the authentication process.

Figure 8:
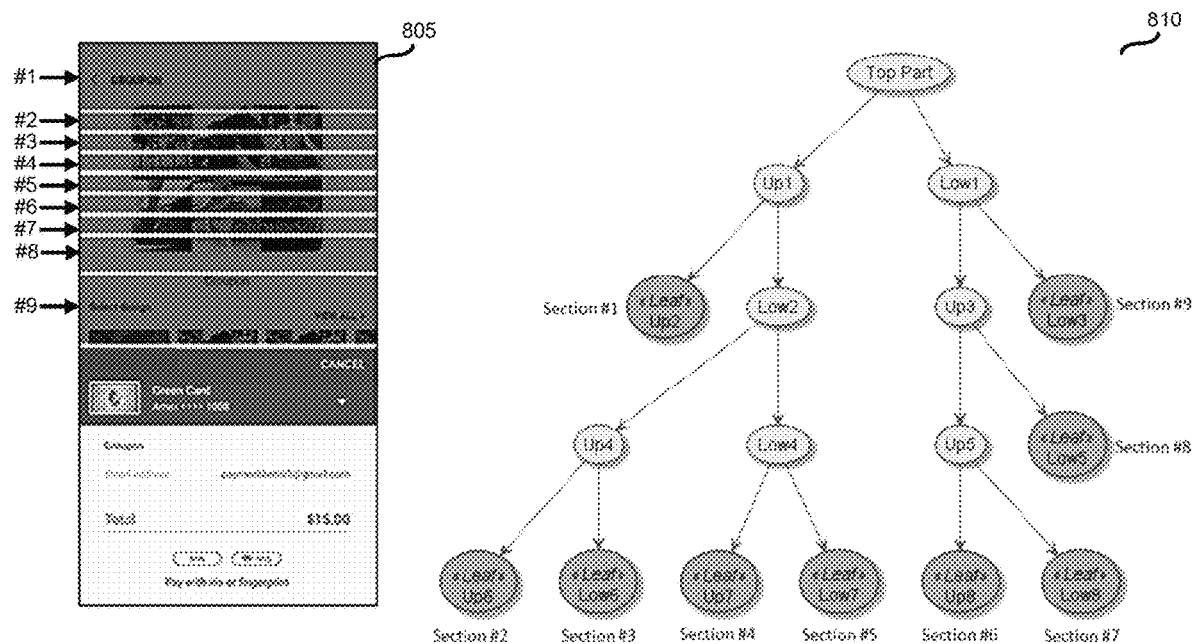
FIG. 8 illustrates aspects of a process for cutting a composited display for transport into a TEE and for reassembly according to various embodiments of this disclosure.

FIG. 8 illustrates aspects of a process for cutting a composited display for transport into a TEE and for reassembly as part of a TUI.

As discussed elsewhere in this disclosure, certain embodiments pass a composited display into a TEE in pieces, to be reconstructed as part of a TUI. According to various embodiments, piecemeal passage of a composited display is performed when a temporary buffer of the TEE imposes restrictions on the size of a file to be passed to the TUI. FIG. 8 provides an example of aspects of a method for breaking up and reassembling a composited image.

Referring to the non-limiting example of FIG. 8, two graphics are shown. On the left, a composited display 805, the top half of which has been broken into nine sections of varying sizes, numbered 1 through 9 is shown. In this illustrative example, the top half of composited display 805 has, in preparation for being passed to a TEE, been broken into pieces, each of which has a file size which is smaller than a threshold value.

On the right side of FIG. 8, a binary tree 810 representing the decision logic for cutting up the top half of composited display 805 is shown. According to certain embodiments, the upper half of composited display 805 is cut via a binary search algorithm. As shown in FIG. 8, the algorithm begins by determining whether the upper half (marked "top part") of composited display 805 has a file size less than a threshold value. If not, the composited display is split into an upper section and a lower section (for example, the branches marked "up1" and "low1") and a determination of whether the upper and lower sections have a file size less than a threshold value is performed again. When a section has a file size less than a threshold, no further cutting is required, and such sections are shown as leaf nodes of binary tree 810 (for example, section #1). The algorithm is performed recursively until the upper half of composited display 805 has been cut into sections, all of which have a file size smaller than the threshold value (e.g., when every branch of binary tree 810 terminates in a leaf node).

In some embodiments, sections 1 through 9 are passed to a TEE individually, along with a representation of binary tree 810. The representation of binary tree 810 passed to the TEE captures, for each leaf node of binary tree 810 the relationship, its relationship to other leaf nodes. For example, the leaf node representing section #4 is shown to the left of the leaf node representing section #5, indicating that section #4 is above section #5. By traversing the leaf nodes of binary tree 810 upwards, the spatial relationships between each of sections 1 through 9 can be determined and the upper half of composited display 805 can be reassembled and incorporated as part of a TUI.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for generating a secure single-tap authentication user interface, comprising:
   capturing a screenshot of a rendered display comprising content from an application operating in an execution environment outside of a trusted execution environment (TEE);
   storing the screenshot in a memory outside of the TEE;
   generating graphical elements of a single-tap authentication user interface;
   generating a progress switching layer;
   responsive to an authentication request, generating and displaying an intermediate display including a first composited display comprising the progress switching layer displayed above the stored screenshot of the content from the application and the graphical elements of the single-tap authentication user interface;
   generating a second composited display, the second composited display comprising the progress switching layer displayed between the stored screenshot comprising content from the application and the graphical elements of the single-tap authentication user interface, wherein the first and second composited displays are single layered images having an appearance of a multi-layered image;
   passing the second composited display from outside the trusted execution environment to the trusted execution environment;
   generating, in the TEE, a trusted user interface (TUI), wherein the TUI includes the second composited display passed from outside the TEE into the TEE, and wherein the TUI defines an actionable region for receiving a user input; and
   displaying, by the TEE, the second composited display, wherein passing the second composited display to the TEE further comprises:
   comparing the second composited display to a threshold file size;
   when the second composited display exceeds the threshold file size, splitting the composited display by separating the second composited display into a screenshot portion and a single-tap authentication portion;
   passing the screenshot portion and the single-tap authentication portion separately into the TEE; and
   reassembling the single-tap authentication portion and the screenshot portion as a single image within the TEE.

2. The method of claim 1, wherein the splitting the second composited display occurs in a portion of a screen which does not include the graphical elements of the single-tap authentication user interface.

3. The method of claim 1, further comprising:
   obtaining, from outside the TEE, coordinate information for the actionable region of the second composited display; and
   passing the coordinate information for the actionable region of the second composited display to the TEE.

4. The method of claim 3, further comprising:
   receiving, in the TEE, a coordinate value of an interaction with the actionable region of the second composited display;
   passing information associated with the coordinate value of the interaction with the actionable region of the second composited display to outside of the TEE; and
   responsive to passing the information associated with the coordinate value of the interaction with the actionable region of the second composited display, triggering an event outside of the TEE associated with the actionable region of the second composited display.

5. The method of claim 1,
   wherein the progress switching layer appears as an intermediate layer below a layer comprising the graphical elements of the single-tap authentication user interface, and
   wherein the progress switching layer appears above the layer comprising the screenshot of the content from the application.

6. The method of claim 1, wherein the second composited display is based on the intermediate display and differs from the intermediate display in that the graphical elements of the single-tap authentication user interface appear above the progress switching layer.

7. An apparatus comprising:
   a touchscreen;
   a processor comprising a trusted execution environment (TEE); and
   a memory containing instructions that, when executed by the processor, cause the apparatus to:
   capture a screenshot of a rendered display comprising content from an application operating in an execution environment outside of the TEE,
   store the screenshot in a memory outside of the TEE,
   generate graphical elements of a single-tap authentication user interface,
   generate a progress switching layer,
   responsive to an authentication request,
   generate and display an intermediate display including a first composited display comprising the progress switching layer displayed above the stored screenshot of the content from the application and the graphical elements of the single-tap authentication user interface,
   generate a second composited display, the second composited display comprising the progress switching layer displayed between the stored screenshot comprising content from the application and the graphical elements of the single-tap authentication user interface, and wherein the first and second composited displays are single layered images having an appearance of a multi-layered image, pass the second composited display from outside the TEE to the TEE, generate, in the TEE, a trusted user interface (TUI), wherein the TUI includes the second composited display passed from outside the TEE into the TEE, and wherein the TUI defines an actionable region for receiving a user input, and display, by the TEE, the second composited display on the touchscreen, wherein the instructions that, when executed by the processor, cause the apparatus to pass the second composited display from outside the TEE to the TEE by:

comparing the second composited display to a threshold file size, when the second composited display exceeds the threshold file size, splitting the composited display by separating the second composited display into a screenshot portion and a single-tap authentication portion, pass the screenshot portion and the single-tap authentication portion separately into the TEE, and reassemble the single-tap authentication portion and the screenshot portion as a single image within the TEE.

8. The apparatus of claim 7, wherein the second composited display is split in a portion of the touchscreen which does not include the graphical elements of the single-tap authentication user interface.

9. The apparatus of claim 7, wherein the memory contains instructions that, when executed by the processor, cause the apparatus to:

obtain, from outside the TEE, coordinate information for the actionable region of the second composited display, and pass the coordinate information for the actionable region of the second composited display to the TEE.

10. The apparatus of claim 9, wherein the memory contains instructions that, when executed by the processor, cause the apparatus to:

receive, in the TEE, a coordinate value of an interaction with the actionable region of the second composited display, pass information associated with the coordinate value of the interaction with the actionable region of the second composited display to outside of the TEE, and responsive to passing the information associated with the coordinate value of the interaction with the actionable region of the second composited display, trigger an event outside of the TEE associated with the actionable region of the second composited display.

11. The apparatus of claim 7, wherein the progress switching layer appears as an intermediate layer below a layer comprising the graphical elements of the single-tap authentication user interface, and wherein the progress switching layer appears above the layer comprising the screenshot of the content from the application.

12. The apparatus of claim 7, wherein the second composited display is based on the intermediate display and differs from the intermediate display in that the graphical elements of the single-tap authentication user interface appear above the progress switching layer.

13. A non-transitory computer-readable medium comprising program code that, when executed by a processor, causes an apparatus to:

capture a screenshot of a rendered display comprising content from an application operating in an execution environment outside of a trusted execution environment (TEE);

store the screenshot in a memory outside of the TEE;

generate graphical elements of a single-tap authentication user interface;

generate a progress switching layer;

responsive to an authentication request, generate and display an intermediate display including a first composited display comprising the progress switching layer displayed above the stored screenshot of the content from the application and the graphical elements of the single-tap authentication user interface;

generate a second composited display, the second composited display comprising the progress switching layer displayed between the screenshot of the content from the application, and the graphical elements of the single-tap authentication user interface, wherein the first and second composited displays are single layered images having an appearance of a multi-layered image;

pass the second composited display from outside the TEE to the TEE;

generate, in the TEE, a trusted user interface (TUI), wherein the TUI includes the second composited display passed from outside the TEE into the TEE, and wherein the TUI defines an actionable region for receiving a user input; and display, by the TEE, the second composited display, wherein the program code, when executed by the processor, causes the apparatus to pass the second composited display from outside of the TEE to the TEE by:

comparing the second composited display to a threshold file size, when the second composited display exceeds the threshold file size, splitting the composited display by separating the second composited display into a screenshot portion and a single-tap authentication portion;

passing the screenshot portion and the single-tap authentication portion separately into the TEE; and reassembling the single-tap authentication portion and the screenshot portion as a single image within the TEE.

14. The non-transitory computer-readable medium of claim 13, wherein the second composited display is split in a portion of touchscreen that does not include the graphical elements of the single-tap authentication user interface.

15. The non-transitory computer-readable medium of claim 13, comprising program code that, when executed by the processor, causes the apparatus to:

obtain, from outside the TEE, coordinate information for the actionable region of the second composited display; and pass the coordinate information for the actionable region of the second composited display to the TEE.

16. The non-transitory computer-readable medium of claim 15, comprising program code that, when executed by the processor, causes the apparatus to:

receive, in the TEE, a coordinate value of an interaction with the actionable region of the second composited display;

pass information associated with the coordinate value of the interaction with the actionable region of the second composited display to outside of the TEE; and responsive to passing the information associated with the coordinate value of the interaction with the actionable region of the second composited display, trigger an event outside of the TEE associated with the actionable region of the second composited display.

17. The non-transitory, computer-readable medium of claim 13, wherein the second composited display is based on the intermediate display and differs from the intermediate display in that the graphical elements of the single-tap authentication user interface appear above the progress switching layer.

* * * * *